United States Patent Office 2,982,761
Patented May 2, 1961

2,982,761

POLYMERIZATION CATALYSTS FOR ACRYLO-NITRILE POLYMERIZATION

Charles H. Campbell, Crestwood, Mo., assignor to The Chemstrand Corporation, Decatur, Ala., a corporation of Delaware No Drawing. Filed Mar. 31, 1958, Ser. No. 724,831

11 Claims. (Cl. 260—85.5)

This invention relates to polymerizable compositions comprising mono-olefinic monomers capable of undergoing addition polymerization and new reduction-oxidation catalyst systems. More particularly, the invention relates to a process for the polymerization of polymerizable mono-olefinic monomers by new oxidation-reduction catalyst systems.

The polymerization of polymerizable mono-olefinic monomers has been initiated by a wide variety of reduction-oxidation catalysts, that is, catalysts in which a reducing agent and an oxidizing agent are employed jointly. Such catalysts are generally referred to as "redox" catalyst systems and the term is so employed hereinafter and in the claims.

Many of the known redox catalyst systems suffer from various defects. For example, peroxy compounds tend to oxidize the polymers as they are formed and alter the color thereof or of the dyestuffs which may be contained in the polymerization mixture. Many of the polymers obtained with peroxy catalysts, for example, contain oxidizing residues which prevent direct use of the polymers for some applications. Furthermore, the peroxy compounds in many instances lead to the production of polymers which have reduced solubility in ordinary solvents. Many of the other known catalyst systems, although being of use in addition polymerization, suffer from diminished activity at elevated temperatures. Not all redox catalyst systems produce dyeable polymers. For example, the perborate-titanous sulfate system produces a polymer that has no affinity for basic dyestuffs. Many other known redox catalyst systems provide polymers which are insoluble in generally used solvents, such as, the cerric sulfate-oxalic acid system. Accordingly, there has been a need for catalyst systems which do not exhibit such defects, and this is particularly true where polymers of high quality are necessary, such as in the textile industry.

It is a primary object of the present invention to provide polymerizable compositions comprising mono-olefinic monomers capable of undergoing addition polymerization and new redox catalyst systems. It is another object of the invention to provide a new process for the polymerization of mono-olefinic monomers wherein new redox catalyst systems are employed. It is a further object of the invention to provide a process for the polymerization of polymerizable mono-olefinic monomers which overcomes the aforementioned disadvantages and produces polymers having good color and dyeability. Other objects and advantages of the present invention will be apparent from the description thereof hereinafter.

In general, the objects of the present invention are accomplished by bringing at least one polymerizable mono-olefinic monomer in contact with a redox catalyst system comprising potassium permanganate and a reducing agent selected from the group consisting of aliphatic mono-, di- and tricarboxylic acids containing 2 to 10 carbon atoms and having at least one radical selected from the group consisting of amino and hydroxyl radicals substituted in the alpha position, and the water soluble salts of such acids, to form a polymerizable composition and subjecting the mixture to polymerization conditions.

Among the aliphatic mono-, di- and tricarboxylic acids which may be employed in the practice of the present invention, there may be named hydroxy acetic acid (glycolic acid), α-hydroxy propionic acid (lactic acid), α-hydroxy butyric acid, α-hydrovy n-valeric acid, α-hydroxy caproic acid, α-hydroxy pelargonic acid, α-hydroxy caprylic acid, α-hydroxy malonic acid, α-hydroxy succinic acid, α-hydroxy suberic acid, α-hydroxy azelaic acid, α-hydroxy sebacic acid, α,α'-dihydroxy glutaric acid, α,α'-dihydroxyadipic acid, α,β-dihydroxy propionic acid (glyceric acid), α,β-dihydroxy butyric acid, α,α'-dihydroxy sebacic acid, α,α'-tetrahydroxy succinic acid (dihydroxy tartaric acid, trihydroxy glutaric acid, hydroxy tricarballylic acid (citric acid), amino-acetic acid (glycine), α-amino n-valeric acid, α-amino n-heptylic acid, amino malonic acid, α-amino succinic acid (aspartic acid), α-amino glutaric acid (glutamic acid), α-amino sebacic acid, α-amino-β-hydroxy propionic acid, α-amino-β-hydroxy butyric acid and the water-soluble alkali metal and ammonium salts thereof, such as the sodium and potassium salts and the isomeric forms of such acids.

The redox catalys systems may be employed in a wide range of concentration in the practice of the present invention. For example, the redox catalysts may be employed in a range of 0.01 to 10.0 percent by weight, based on the weight of the monomers. However, it is the usual practice to utilize the catalysts in a small amount in comparison with the total weight of the monomers, and it is preferable to employ the redox catalysts of this invention in a range of 0.5 to 5.0 percent, by weight of the monomers.

In general, each constituent of the catalyst system may be employed in the range of 10 to 90 percent, based on the total weight of the catalyst system, in order to obtain satisfactory polymers. However, when the prevention of color formation in the polymer is desirable or necessary, such as when producing polymers suitable for forming fibers and filaments therefrom for use in the textile field, the acid, or water-soluble salt thereof, portion of the redox catalyst should be employed at least in an amount sufficient to reduce all of the potassium permanganate. Generally, an amount of acid or water-soluble salt thereof in the range of 25 to 90 percent, based on the weight of the catalyst system, is sufficient for this purpose.

The redox polymerization catalysts of this invention are effective in any of the well-known methods which may be employed to bring about polymerization of mono-olefinic polymerizable monomeric materials. Thus, the polymerization of the suitable mono-olefinic monomers can be carried out in a heterogeneous system such as an aqueous emulsion or dispersion, wherein the monomeric material is dispersed in a suitable medium, such as water, and the like, with the aid of a suitable emulsifying agent, if desired or necessary, and in which polymerization is effected by adding the catalytic system and agitating until a polymer is formed. The redox catalyst systems of this invention may also be employed when the polymerization is conducted in a homogeneous system after heating the monomeric material in a suitable solvent in the presence of the polymerization catalysts. The polymerization may be carried out by any of the well-known batch, semi-continuous or continuous procedures. When employing the redox catalyst systems of this invention to polymerize mono-olefinic monomers, the polymerization reaction may be carried out at any suitable temperature from 0° C. up to the boiling point of the polymerization reaction medium. However, in general, the polymerization reaction will normally be carried out at a temperature in the range of 20° C. to 80° C. in the case of the monomers defined herein.

In order to insure the optimum concentration of catalyst, it is frequently desirable to add the catalyst continuously or intermittently throughout the course of the reaction. The preferred practice involves the charging of the monomer or mixture of monomers and the redox catalyst system simultaneously over a period of time to a reaction vessel containing a suitable medium. That is, in the case of some monomers, the redox catalyst may be mixed with the monomers prior to addition to the reaction medium. In many instances, it is desirable to add the redox-catalyst to the reaction vessel separate from the monomers but simultaneously therewith. Then again, it is possible to form a polymerizable mixture of the monomers and redox-catalyst which can in turn be placed in a reaction vessel and thereafter polymerized in normal fashion. What procedure of monomers and redox catalyst addition is chosen will depend upon the properties desired in the finished product or polymer. For example, in the case of copolymers to be employed in the manufacture of fibers and filaments, it is generally desirable to employ intermittent or continuous addition of monomers, since the rate of polymerization of each monomer will vary and control is desirable in order to obtain the final specified copolymer composition.

Generally, the polymerization of mono-olefinic monomers is carried out under acidic conditions, that is, the reaction mixture is usually maintained at a pH in a range of 1 to 6 and preferably within the range of 3 to 5. In order to obtain the optimum properties in the polymer, and particularly when a continuous polymerization method is employed, the pH of the polymerization mixture should be held constant throughout the entire reaction period. If necessary, known buffer salts may be employed to adjust and maintain the pH at the desired level.

The catalysts of the instant invention are useful in forming polymerizable compositions which may be employed in the preparation of various polymers from mono-olefinic monomers. Among the suitable monomers useful in the practice of the present invention, there may be named acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1 - chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted t e r t i a r y heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other $>C=C<$ containing polymerizable materials.

The catalysts of the present invention are not only useful in the homopolymerization of any of the above-mentioned mono-olefinic monomers, but are likewise in the preparation of copolymers and terpolymers from mixtures of any of said monomers. For example, the copolymers and terpolymers comprising acrylonitrile and one or more different polymerizable mono-olefinic monomers are of particular utility in the fiber and filament forming art when such polymers contain at least 80 percent acrylonitrile and preferably from 80 to 98 percent by weight of acrylonitrile and from 2 to 20 percent of another mono-olefinic monomer copolymerizable therewith. It is to be understood, of course, that any proportion of any of the above-named monomers may be employed in the manufacture of copolymers, and the like, therefrom, depending upon the end use to which said polymer will be put, such as in coating compositions, molding compositions, lacquers, and the like.

Further details of the present invention are set forth in the following examples which are merely intended to be illustrative and not limitative, and the invention should not be limited thereby except insofar as the same may be limited by the appended claims. Unless otherwise indicated, all parts and percents in the following examples are by weight.

EXAMPLE I

A polymerizable composition was prepared and polymerized as follows: Over a period of two hours, a 250 gram mixture containing 94 percent acrylonitrile and 6 percent vinyl acetate was introduced into a reaction vessel equipped for stirring and under a nitrogen atmosphere and containing 1250 ml. of water and 3 ml. of concentrated sulfuric acid. During the monomer addition, a solution of 5.0 grams of potassium permanganate in 120 ml. of water and 5.0 grams of citric acid in 120 ml. of water were also added to the reaction vessel. The reaction temperature in the vessel was maintained at about 50° C. After the addition of the reactants was complete, the reaction mixture was stirred for 45 minutes at 50° C. Subsequently, the polymer was filtered off and washed thoroughly with water. The polymer was then dried to a constant weight in an oven at 50° C. 218 grams of polymer were produced which amounted to a yield of 87.2 percent. The copolymer had a specific viscosity of 0.130 when 0.1 gram of the copolymer was dissolved in 100 ml. of N,N-dimethylformamide at 20° C.

EXAMPLE II

A polymerizable composition was prepared and polymerized as follows: To 100 ml. of water containing 0.2 gram of tartaric acid, there was added 10 grams of acrylonitrile and 0.1 gram of potassium permanganate. The mixture was heated on a water bath at about 60° C. for two minutes and set aside. After 30 minutes, 0.2 gram of tartaric acid was again added to the reaction mixture and the mixture reheated on the water bath for two minutes. After standing 30 minutes, the slurry was filtered, washed and dried at 50° C. in an oven. The polymeric product weighed 5.0 grams corresponding to a 50 percent yield. The polymeric product had a specific viscosity of 0.406 when 0.1 gram of the polymer was dissolved in 100 ml. of N,N-dimethylformamide at 20° C.

EXAMPLE III

A polymerizable composition was prepared and polymerized as follows: To 100 ml. of water at 60° C. and containing 0.4 gram of about an 85 percent aqueous solution of lactic acid and 10 grams of acrylonitrile, there was added 0.1 gram of potassium permanganate. Polymerization began immediately. On standing overnight, a copious white precipitate formed. The precipitate was filtered off and washed with water and dried at 50° C. to a constant weight. The polymeric product had a specific viscosity of 0.472 when 0.1 gram of the polymer was dissolved in 100 ml. of N,N-dimethylformamide at 20° C.

EXAMPLE IV

A polymerizable composition was prepared and polymerized as follows: Over a period of two hours, a 250 gram mixture containing 94 percent acrylonitrile and 6 percent vinyl acetate was introduced into a reaction vessel equipped for stirring and under a nitrogen atmosphere and containing 1250 ml. of water and 3 ml. of concentrated sulfuric acid. During the monomer addition, a solution of 5.0 grams of potassium permanganate in 120 ml. of water and 5.0 grams of glycine in 120 ml. of water were also added to the reaction vessel. The reaction temperature in the vessel was maintained at about 50 C. After the addition of the reactants was complete, the reaction mixture was stirred for 45 minutes at 50 C. At this point the slurry had become considerably thick and an additional 250 ml. of water were added to the reaction mixture and it was heated with stirring for another two hour period. Subsequently, the polymer was filtered off and washed thoroughly with water. The polymer was then dried to a constant weight in an oven at 50° C. There was produced a yield of 90.0 percent. The copolymer had a specific viscosity of 0.666 when 0.1 gram of the copolymer was dissolved in 100 ml. of N,N-dimethylformamide at 20° C.

EXAMPLE V

A polymerizable composition was prepared and polymerized as follows: Over a period of two hours, a 250 gram mixture containing 94 percent acrylonitrile and 6 percent vinyl acetate was introduced into a reaction vessel equipped for stirring and under a nitrogen atmosphere and containing 1250 ml. of water and 3 ml. of concentrated sulfuric acid. During the monomer addition, a solution of 5.0 grams of potassium permanganate in 120 ml. of water and 5.0 grams of glycolic acid in 120 ml. of water were also added to the reaction vessel. The reaction temperature in the vessel was maintained at about 50° C. After the addition of the reactants was complete, the reaction mixture was stirred for 45 minutes at 50° C. and 300 ml. of water were added thereto in order to dilute the slurry which had become thick. The reaction was heated and stirred for an additional 80 minutes until polymerization was complete. The polymer was then dried to a constant weight in an oven at 50° C. There was produced a yield of 80.0 percent. The copolymer had a specific viscosity of 0.611 when 0.1 gram of the copolymer was dissolved in 100 ml. of N,N-dimethylformamide at 20° C.

EXAMPLE VI

Samples of the polymeric compositions, which were prepared according to the procedure of Example I, were dyed with excess Sevron Blue-B, a basic dyestuff (C.I. Basic Blue 21—Du Pont, as published in Colour Index, vol. I, The Society of Dyers and Colourists and The American Association of Textile Chemists and Colorists, 2nd edition, 1956), at 80° C. for one hour. The percentage of dye absorbed was compared with polymer samples prepared using a sodium perborate-titanous sulfate catalytic system and the results thereof are recorded in the following table.

Table No. 1

| Catalyst Systems | Percent Dye Absorbed, Based on the Weight of Polymer |
|---|---|
| (1) $KMnO_4$—citric acid | 9.90 |
| (2) $KMnO_4$—citric acid | 9.74 |
| (3) $NaBO_3$—$TiSO_4$ | 1.50 |

The table shows that the potassium permanganate-citric acid redox catalyst system produced polymers exhibiting extraordinary increases in dye absorption in comparison with polymers prepared with the conventional sodium perborate-titanous sulfate catalyst.

The new polymerizable compositions employed in the process of this invention exhibit many advantages. For example, by employing the catalyst and process of the instant invention, it is possible to produce high quality polymers which are not discolored and which exhibit an excellent dye absorption rate. Furthermore, the constituents of the catalytic systems utilized in the polymerizable compositions of the invention are inexpensive and readily available and they may be employed on all existing types of equipment employed to produce mono-olefinic polymers.

It will be understood to those skilled in the art that many apparently widely different embodiments of the invention can be made without departing from the spirit and scope thereof. Accordingly, it is to be understood that this invention is not to be limited to the specific embodiments thereof except as defined in the appended claims.

I claim:

1. A process for preparing polymers which comprises bringing a monomeric material containing at least 80 percent acrylonitrile and up to 20 percent of at least one other mono-olefinic monomer in contact with from 0.01 to 10 percent based on the total weight of said monomeric material of a redox catalyst system consisting of 10 to 90 percent by weight of potassium permanganate and 90 to 10 percent by weight of a reducing agent selected from the group consisting of aliphatic mono-, di-, and tricarboxylic acids which contain from 2 to 10 carbon atoms and have at least one radical selected from the group consisting of amino and hydroxyl radicals substituted in the alpha position, and the water-soluble alkali metal and ammonium salts of said acids, and reacting the mixture at a temperature in the range of from 0° C. to the boiling point of the polymerization reaction medium.

2. The process of claim 1 wherein the monomeric material is acrylonitrile.

3. The process as defined in claim 1 wherein the monomeric material is a mixture of 80 to 98 percent acrylonitrile and 2 to 20 percent of another mono-olefinic monomer.

4. The process of claim 1 wherein the monomeric material is a mixture of 80 to 98 percent acrylonitrile and 2 to 20 percent of vinyl acetate.

5. The process of claim 1 wherein the monomeric material is a mixture of 80 to 98 percent acrylonitrile and 2 to 20 percent of methyl methacrylate.

6. The process of claim 1 wherein the monomeric material is a mixture of 80 to 98 percent acrylonitrile and 2 to 20 percent of vinyl chloride.

7. The process of claim 1 wherein the reducing agent is glycolic acid.

8. The process of claim 1 wherein the reducing agent is citric acid.

9. The process of claim 1 wherein the reducing agent is tartaric acid.

10. The process of claim 1 wherein the reducing agent is lactic acid.

11. The process of claim 1 wherein the reducing agent is glycine.

References Cited in the file of this patent

UNITED STATES PATENTS

| 2,380,591 | Fryling | July 31, 1945 |
| 2,581,402 | Fryling | Jan. 8, 1952 |